United States Patent [19]

Shelley

[11] Patent Number: 5,287,391
[45] Date of Patent: Feb. 15, 1994

[54] METERING SYSTEM

[75] Inventor: Stephen N. Shelley, Cheshire, England

[73] Assignee: British Nuclear Fuels plc, Cheshire, United Kingdom

[21] Appl. No.: 19,179

[22] Filed: Feb. 16, 1993

[30] Foreign Application Priority Data

Feb. 15, 1992 [GB] United Kingdom ............... 9203268

[51] Int. Cl.$^5$ ............................................. G21C 19/36
[52] U.S. Cl. .................................. 376/261; 252/633; 209/682
[58] Field of Search ............... 376/245, 260, 261, 264, 376/266, 272; 252/626, 633; 209/659, 680, 682

[56] References Cited

U.S. PATENT DOCUMENTS

| 3,672,500 | 6/1972 | Hayes | 209/695 |
| 4,511,499 | 4/1985 | Meuschke et al. | 376/261 |
| 4,537,711 | 8/1985 | Wilhelm et al. | 252/633 |
| 4,680,009 | 7/1987 | Ernst et al. | 432/117 |
| 5,054,747 | 10/1991 | Perry | 266/205 |

FOREIGN PATENT DOCUMENTS

| 0089824 | 9/1983 | European Pat. Off. . |
| 0113448 | 7/1984 | European Pat. Off. . |
| 0210658 | 2/1987 | European Pat. Off. . |
| 1468684 | 3/1977 | United Kingdom . |
| 2229800A | 10/1990 | United Kingdom . |

OTHER PUBLICATIONS

Patent Abstracts of Japan; T. Yoshiharu; "Centrifugal Separator for Reprocessing of Nuclear Fuel"; Published Mar. 1984, JP59046154.

Patent Abstracts of Japan; K. Katsunori et al.; "Method and Device for Charging Raw Material to Sintering Machine"; Published Mar. 1989, JP1083626.

Primary Examiner—Daniel D. Wasil
Attorney, Agent, or Firm—Nixon & Vanderhye

[57] ABSTRACT

A system for metering the feed of portions of nuclear fuel assemblies and comprising a declivitous screen for receiving the portions and separating the portions into larger and smaller components thereof. The separated components are independently fed into a storage container by a variety of means including hoppers, receptacles, chambers, troughs and chutes, acting in a sequential manner, so as to provide efficient filling of the container.

6 Claims, 2 Drawing Sheets

METERING SYSTEM

BACKGROUND OF THE INVENTION

This invention relates to a metering system, and more particularly, for a metering system for controlling the feed of portions of nuclear fuel assemblies.

After reprocessing in a chemical plant where the nuclear material (e.g. $UO_2$) in the nuclear fuel assemblies is dissolved in a solvent stream, residues of the assemblies need to be encapsulated in a cementitious matrix in standard storage containers or drums. These residues chiefly comprise appendages of the nuclear fuel assemblies and hulls which are small sheared tubular portions of cladding tubes which contained the nuclear material. In order to provide a high utilisation of the space within the drum, it is advisable to regulate the ratio of appendages to hulls fed to the drum.

SUMMARY OF THE INVENTION

According to the present invention there is provided a system for metering the feed of portions of nuclear fuel assemblies, the system comprising a declivitous screen for receiving the portions and for separating the portions into larger and smaller components thereof, a first receptacle for collecting the larger components falling from the screen and for discharging the larger components into a collecting receptacle, the collecting receptacle being controllable so as to discharge the larger components therein on to means for directing the larger components into a container, means for sensing the level of the portions in the container, a buffer chamber for receiving the smaller components passing through the screen, a discharge port of the buffer chamber for discharging the smaller components from the buffer chamber into an oscillatable trough adapted to oscillate around the longitudinal axis thereof to discharge a metered quantity of the smaller components therefrom, and means for receiving the smaller components discharged from the trough and for feeding said smaller components to the container.

The invention will now be further described by way of example only with reference to the accompanying drawings, in which:

DESCRIPTION OF THE PREFERRED EMBODIMENTS

Figure 1:
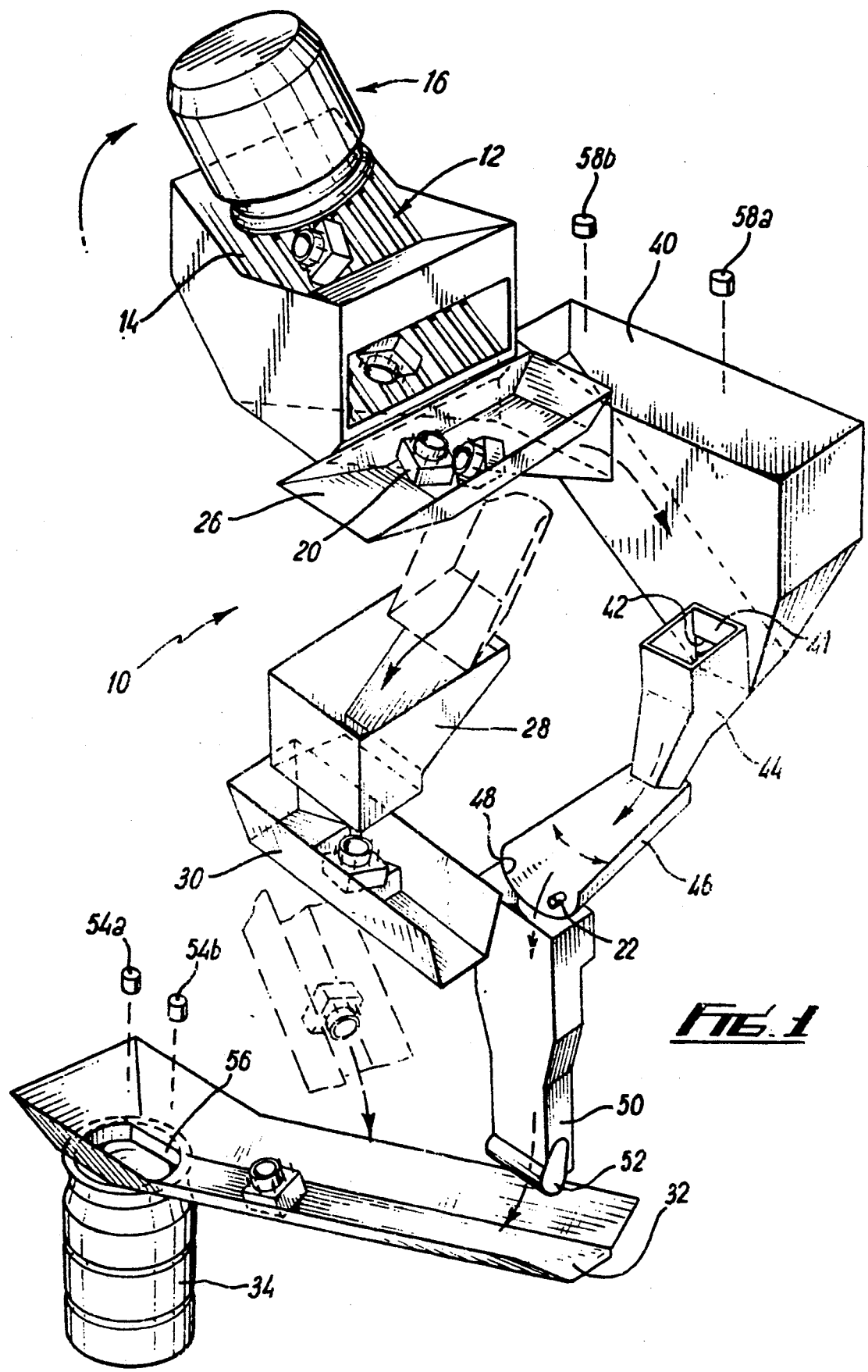
FIG. 1 shows a perspective representation of a metering system.
Figure 2:
FIGS. 2 and 3 show perspective representations of components to be metered by the system of FIG. 1.
Figure 3:
Figure 4:
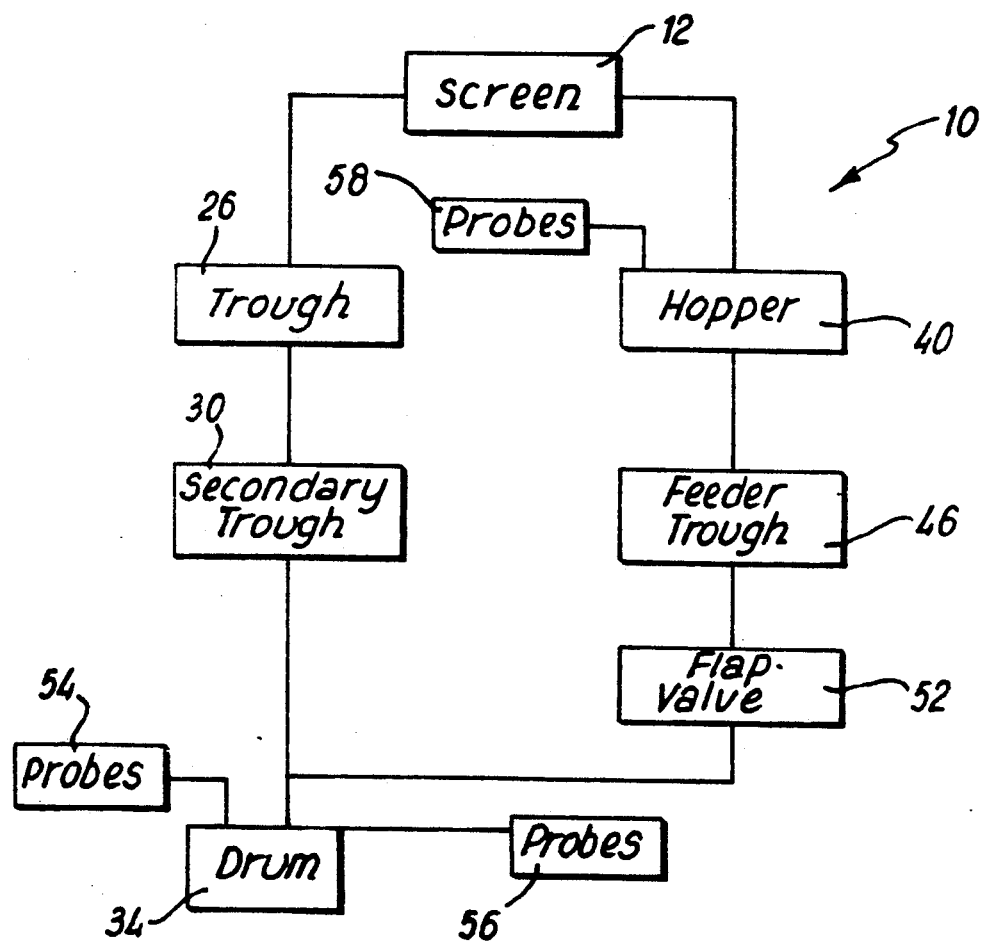
FIG. 4 shows a schematic arrangement of the system of FIG. 1.

Referring now to FIGS. 1 and 4, a metering system 10 is shown and comprises a declivitous screen 12 provided by a parallel array of spaced bars 14. A nuclear transport container 16 in an inverted position is arranged to discharge on to the bars 14 relatively large nuclear fuel assembly appendages 20 (see FIG. 2) and relatively small hulls 22 in the form of sheared short lengths of nuclear fuel cladding tubes (see FIG. 3). The appendages 20 are wider than the spaces between the bars 14, and discharge into a receptacle provided by a tiltable trough 26. A deflector chute 28 below trough 26 guides the appendages 20 from the trough 26 in a lowered position (shown in broken line) into a secondary tiltable trough 30. In a lowered position (shown in broken line) the secondary trough 30 discharges into a delivery chute 32 which delivers the appendages 20 into a drum 34.

The hulls 22 fall between the bars 14 into a hopper 40 having a lower discharge port 42. A discharge chute 44 from the discharge port 42 discharges hulls 22 from the hopper 40 through a maintenance shut-off valve 41. A feeder trough 46 of hemi-frusto-conical form having an included conical angle of about 12° is disposed under the discharge chute 44, and is inclined downwardly at about 12½° towards its wider discharge end 48. The feeder trough 46 is capable of angularly oscillating around its longitudinal axis at an angle of about 30° either side of a mean position and at a frequency of about 15 oscillations per minute. A positioning chute 50 is located below the discharge end 48 to direct and position hulls 22 from the feeder trough 46 through a flap valve 52 on to the delivery chute 32. Two ultrasonic probes 54a, 54b are positioned to detect levels of the appendages 20 and the hulls 22 at different positions in the drum 34, whilst two capacitance probes 56 (only one is shown) at the entry of the drum 34 monitor for overfilling of the drum 34. Two other ultrasonic probes 58a, 58b monitor the level of the hulls 22 at respective ends of the hopper 40.

Operation of each element of the sytem 10 is initiated by an operator. Then whilst the feeder trough 46 is oscillating, the hulls 22 are gravity fed from the hopper 40 through the discharge chute 44 on to the feeder trough 46. A restricted number of hulls 22 fall from the discharge end 48 of the feeder trough 46 into the positioning chute 50 from which they are directed on to the delivery chute 32 and hence in to the drum 34. Initially a buffer layer of hulls 22 is fed into the drum 34. Subsequently a layer of appendages 20 is formed in the drum 34, the remaining space in the drum 34 then being filled with hulls 22.

Although the system 10 has been shown as being fully under manual control, interlocks are provided (not shown) to ensure that the correct sequence of operation of the elements of the system 10 can only be initiated, and that overfilling of the drum 34 is prevented.

Although the system 10 has been described as being manually initiated, it should be possible to interrelate the elements of the system 10 through a control unit so as to automate the operations of the system 10.

It will be understood that although the invention has been described in relation to the separate metering of appendages and hulls, other components of nuclear fuel assemblies or the like may be similarly separated by the system and fed into a suitable container or receptacle.

To assist maintenance and replacement of defective elements, the system 10 is desirably of modular form.

I claim:

1. A system for metering the feed of portions of nuclear fuel assemblies, the system comprising a declivitous screen for receiving the portions and for separating the portions into larger and smaller components thereof, a first receptacle for collecting the larger components falling from the screen and for discharging the larger components into a collecting receptacle, the collecting receptacle being controllable so as to discharge the larger components therein on to means for directing the larger components into a container, means for sensing the level of the portions in the container, a buffer chamber for receiving the smaller components passing through the screen, a discharge port of the buffer chamber for discharging the smaller components from the buffer chamber into an oscillatable trough adapted to oscillate around the longitudinal axis thereof to discharge a metered quantity of the smaller components therefrom, and means for receiving the smaller components discharged from the trough and for feeding said smaller components to the container.

2. A system as claimed in claim 1 and wherein the means for sensing the level of the portions in the container comprise ultrasonic probes.

3. A system as claimed in claim 1 and wherein means are provided for monitoring overfilling of the container and the said means comprise capacitance probes.

4. A system as claimed in claim 1 and wherein the system is of modular form so as to assist maintenance and replacement of defective elements.

5. A system as claimed in claim 1 and wherein the system is manually initiated.

6. A system as claimed in claim 1 wherein the elements of the system are interrelated through a control system so as to automate the operation of the system.

* * * * *